United States Patent Office 3,081,296
Patented Mar. 12, 1963

3,081,296
ACYLATION OF STARCH AND CELLULOSE
Clifford E. Smith and John V. Tuschhoff, Decatur, Ill., assignors to A. E. Staley Manufacturing Company, Decatur, Ill., a corporation of Delaware
No Drawing. Filed Apr. 12, 1961, Ser. No. 102,371
10 Claims. (Cl. 260—233.5)

This invention relates to the preparation of cross-linked polysaccharide acylates. More particularly, it relates to the reaction of starch with a vinyl ester of a monocarboxylic acid whereby the starch is first acylated and then cross-linked with acetaldehyde.

This invention is a continuation-in-part of Serial No. 792,972 filed February 13, 1959, now Patent No. 3,022,-289, which is a continuation-in-part of Serial No. 661,032, filed May 23, 1957, now abandoned, and Serial No. 673,-172, filed July 22, 1957, now United States Patent 2,928,-828. In Serial No. 792,972 we disclosed the acylation of starch with esters of a monocarboxylic acid and an ethylenically unsaturated alcohol. We have discovered that during this reaction an aldehyde, usually acetaldehyde, is generated in situ as a by-product. The aldehyde, which was generated in situ, was washed out as an unusable and deleterious by-product in all cases except where the acylating agent was a diester, namely allylidene diacetate. The allylidene diacetate produced acrolein in situ, which, having two functional etherifying groups, cross-linked the starch as the starch was acylated under alkaline conditions. While this reaction of allylidene diacetate has certain advantages the degree of cross-linking of the starch is not susceptible of control without the curtailment of the acylation function of the ester. In other words, the acylation and cross-linking reactions of allylidene diacetate are not independent since they occur at essentially the same pH.

The object of this invention is to prepare new cross-linked starch acylates from vinyl esters of a monocarboxylic acid, wherein the above described aldehyde by-product is utilized as an efficient cross-linking agent instead of being discarded.

Another object of this invention is to prepare cross-linked starch acylates from a single compound, which functions as both an acylating agent and a cross-linking agent, where the degree of cross-linking and extent of acylation can be controlled independently of each other.

Another object of this invention is to prepare granular cross-linked starch acylates having paste properties making them particularly suitable for use in making food products and in rock wool tile.

The objects of this invention are attained, generally speaking, by acylating starch with a vinyl ester of a monocarboxylic acid at an alkaline pH, whereby acetaldehyde is generated in situ, terminating said acylation reaction and initiating a cross-linking reaction with the generated acetaldehyde by adjusting the pH of the reaction to below 4. When the starch has been cross-linked to the desired degree, the cross-linking reaction is terminated by adjusting the pH of the reaction to about 5 or higher. In some cases the reaction may be allowed to continue until all of the generated aldehyde is used up.

The starch used in this invention may be any native starch, modified native starch or derivatized native starch having etherifiable hydroxyl groups. Corn starch, tapioca starch, wheat starch, rye starch, potato starch, sago starch, waxy corn starch and the amylose and amylopectin fractions therefrom are representative of the various native starches and starch fractions that may be used in this invention. Any of these starches may be modified by enzyme treatment, by oxidation with hypochlorite or by hydrolysis with an acid, for example, or derivatized by treatment with ethylene oxide, ethylene imine, etc. The starch derivatives also include other starch ethers, such as carboxyethyl or carboxymethyl starch, cross-linked starches, such as those disclosed in our Serial No. 102,365 filed on even date with this application, which are particularly suitable for pie fillings, etc. In those cases where derivatized starches are employed, the derivatized starch must have sufficient hydroxyl groups available for both the acylation and the cross-linking steps. In addition to the aforementioned starches, we can use various other polysaccharides, such as cellulose, carboxymethyl cellulose, methyl cellulose, cellulose acetate, inulin, etc.

The preferred vinyl esters are the vinyl esters of lower aliphatic acids, such as vinyl acetate, vinyl propionate and vinyl formate. The higher fatty acid esters of vinyl alcohol, such as vinyl butyrate, are not as reactive acylating agents as the lower fatty acid esters; however, useful results can be obtained even with vinyl stearate. Various other esters, such as vinyl chloroacetate, vinyl phenylacetate, vinyl benzoate, vinyl toluate, vinyl naphthenate, etc., can be used. All of the above compounds can be represented by the formula

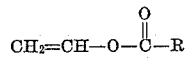

$$CH_2=CH-O-\overset{O}{\underset{\|}{C}}-R$$

wherein R is selected from the group consisting of alkyl having from 1–17 carbon atoms, haloalkyl having from 1–17 carbon atoms, aryl, alkaryl having from 1–23 carbon atoms and aralkyl having from 1–23 carbon atoms. These vinyl esters can be used in an amount equal to from about 0.5%–50% by weight of the dry starch in order to get products having from 0.1%–30% by weight monoacyl groups. In some cases the percent by weight of acyl groups in the starch acylate will be so low as to be within the experimental error of the determination for acyl groups. In those cases the presence of acyl groups in the product can be inferred from the change in the starch product (particularly the paste properties) which has been caused by the generated acetaldehyde. In all cases the degree of cross-linking of the starch by the generated acetaldehyde is independent of the amount of vinyl ester used since the cross-linking can be terminated at any point; a second cross-linking agent may be employed, if desired.

The preferred catalyst for the acylation reaction is one which buffers the reaction at about 9–10 pH. Sodium phosphate meets this requirement quite well. Other suitable catalysts are alkali metal hydroxides, such as sodium hydroxide and potassium hydroxide; alkali metal salts, such as $Na_2CO_3$ and mixtures of NaCl with NaOH; ammonium hydroxide; quaternary ammonium hydroxides, such as tetramethyl ammonium hydroxide; amines, such as trimethyl amine and pyridine; etc. Useful reaction can be obtained over the pH range of about 7.5 to 12.5. Aqueous solutions of these alkaline catalysts can also be used to terminate the acetaldehyde cross-linking reaction.

The cross-linking catalysts, which also terminate the acylation reaction, are strong acids, such as sulfuric acid, hydrochloric acid and benzenesulfonic acid, which are capable of lowering the pH of the acylation medium to below 4.

In somewhat greater detail, granular starch is suspended in an aqueous medium in which the starch comprises about 2–70% by weight of the composition and then an alkaline catalyst is added to adjust the pH to the desired level between about 7.5 and 12.5. Alternatively, granular starch may be suspended in an aqueous alkaline medium. In either case, the starch may be pasted, if desired, prior to reaction with the vinyl ester or during either the acylation step or cross-linking step. In those cases where the starch is pasted, it can be used in that form, concentrated partially on hot rolls, or recovered as a dried paste by conventional drying methods, such as spray drying or heating on hot rolls. However, we prefer to carry out these reactions on a granular starch suspension under non-gelatinizing conditions in order to recover a granular product, since the granular product is more easily separated from the reaction mixture. Further, the pasted product cannot be washed free of salts and excess catalyst unless organic solvents are used. Superficially dry granular starch containing at least about 10% by weight moisture offers the same isolation advantages over the pasted product as a starch suspension.

The acylation rate of the preferred vinyl esters is moderately rapid over the temperature range of 75° F. to 115° F. For example, the reaction between a starch suspension and vinyl acetate is essentially complete in as little as 10 minutes or less at 100° F. Useful, but slower reaction rates are obtainable at temperatures as low as 35° F.–40° F. Higher temperatures increase the rate of reaction, and the temperature is limited only by the pasting temperature of the starch derivative where it is desired to preserve the granular form during reaction; and otherwise by the decomposition temperature of starch. Reaction efficiency at the higher temperatures is improved by conducting the acylation reaction in a closed vessel to prevent loss of volatile monoesters and acetaldehyde. The acylation reaction can be terminated at any time by lowering the pH of the reaction to about 7 or less.

The acetaldehyde cross-linking reaction starts when the pH of the acylation reaction is lowered below about 4. At a pH above about 4, essentially no cross-linking takes place from the acetaldehyde generated by the vinyl esters. Further, the vinyl esters do not form acetaldehyde at an acid pH prior to the alkaline acylation reaction. In other words, the aldehyde cross-linking agent is formed solely as a by-product of the alkaline acylation reaction and is not generated from the esters of this invention at an acid pH. While any pH below 4 can be utilized in this cross-linking step, the acidity should be regulated in order to prevent undesirable hydrolysis of the starch, although this hydrolysis may sometimes be desirable. The aldehyde cross-linking can be terminated when the starch has the desired degree of cross-linking, by raising the pH of the reaction mixture to about 5 or higher. The extent of cross-linking can be controlled by various methods, such as the alkaline fluidity of the product, Brookfield viscosity of the pasted product, etc.

The cross-linking reaction can be advantageously carried out at the same temperature as the acylation reaction. Usually about 10 minutes to four hours at 100° F. is sufficient to give granular cross-linked starch acylates, which vary from products that are more viscous than the untreated granular starch to products that are completely inhibited and will not paste.

The completely inhibited starch acylates are useful as dusting powders, while the less highly cross-linked granular products are useful in food products, such as salad dressings and pie fillings; and in rock wool tiles. The pasted cross-linked starch acylates as well as the granular cross-linked starch acylates are useful in preparing textile sizes and paper coatings.

The examples following are merely illustrative and should not be construed as limiting the scope of the invention.

The alkaline fluidity test referred to in the examples that follow is performed in this manner. The concentration of the alkaline starch dispersion prior to the addition of the vinyl ester is determined, for example, by measuring the density in degrees Baumé. The exact quantity of slurry which contains 2.0 grams of starch (dry solids basis) is calculated from the Baumé. Ten minutes after the pH of the acylation reaction has been lowered to below 4, an appropriate volume of starch slurry (containing 2.0 grams starch) is placed in a 400 ml. fluidity beaker. The starch slurry is then diluted to approximately 100 ml. with an aqueous solution containing 0.95 grams of NaOH. In other words the suspension (approximately 100 cc.) always contains 2.0 grams starch and 0.95 gram of NaOH. When the starch comprises from about 45–50% by weight of the reaction mixture, conveniently, 95 ml. of 0.25 N NaOH can be used to dilute the 2.0 grams (dry solids basis) of starch in the fluidity beaker to approximately 100 cc. The starch suspension is stirred at between 450 and 460 r.p.m. for three minutes in order to paste the starch. The resulting starch solution is poured into a standard fluidity funnel having a specific "water-time" between about 30 and 40 seconds. The "water-time" is the number of seconds it takes for 100 cc. of water to flow through the funnel. The number of cc. of starch solution, which flows through the funnel in the water-time, is the alkaline fluidity of the starch. The extent of cross-linking of the starch is followed by repeating this test every ten minutes until the alkaline fluidity of the starch reaches the desired level. During the pasting step essentially all monoacyl groups are saponified off of the starch acylate.

EXAMPLE 1

Thirty grams of $Na_3PO_4 \cdot 10H_2O$ was added to a suspension of 1,000 grams corn starch (dry solids basis) in 1,150 cc. of water. Seventy grams of vinyl acetate was added to the suspension, which was maintained at 100° F. After one hour the acylation reaction was terminated by lowering the pH of the reaction mixture to 3 with $H_2SO_4$ and the acetaldehyde generated during the acylation step started to cross-link the starch. The extent of cross-linking of the starch was followed by alkaline fluidity determinations. The alkaline fluidity of native corn starch is 36 cc. During the course of 3½ hours, the alkaline fluidity dropped to about 17 cc. and then rose to 73 cc. The reaction was terminated by adjusting the pH to 5.5 with aqueous sodium carbonate. The still granular starch was filtered, washed with water, slurried in water, filtered again and then dried to about 10% by weight moisture. The cross-linked starch acetate product had 2.10% by weight acetyl.

In order to simulate the preparation of a soft cream pie filling, 60 grams of the cross-linked starch acetate and 390 grams of sucrose were dispersed in 710 grams water and the pH was adjusted to 7 with $Na_2CO_3$. To determine whether this has the proper viscosity characteristics, the suspension was placed in a Corn Industries Research Foundation viscometer equipped with a hot-water jacket maintained at 201° F. The torque in gm.-cm. (a measure of viscosity) of the starch dispersion, after ten minutes, was 856; after 15 minutes, was 824; and after 40 minutes, was 712. The above indicated that the cross-linked starch acylate had the proper paste viscosity characteristics for soft cream pie fillings.

EXAMPLE 2

Example 1 was repeated except that the vinyl acetate acylation reaction was terminated by lowering the pH of the reaction mixture to 2.5 after 30 minutes at 105° F. and the cross-linking step was terminated by increasing the pH above 5 after an hour and one-half at 105° F., when the alkaline fluidity had reached 88 cc. The acetyl content was 1.73%.

The viscosity in gm.-cm. of the products in the Corn Industries viscometer after 10 minutes, was 520; after 15 minutes, was 616; and after 40 minutes, was 720.

EXAMPLE 3

This example illustrates the acylation and acetaldehyde cross-linking of a partially cross-linked starch. Seventy grams of vinyl acetate was added to an aqueous suspension of 1,200 grams of water and 1,000 grams (dry solids basis) of acrolein-cross-linked corn starch having a 2-gram alkali fluidity of 50 cc. The pH of the reaction mixture was about 10 and a temperature of 100° F. was maintained. After two hours the reaction was terminated by lowering the pH to 2.9 with $H_2SO_4$. After one hour the acetaldehyde cross-linking was terminated by adjusting the pH of the reaction mixture to 5.5 and the starch product had an alkaline fluidity of 85 cc. The slurry was filtered and the starch product was washed with water, reslurried in water, filtered, washed with water and then dried to about 10% moisture. The cross-linked starch acetate product had an acetyl value of 1.85%.

In order to simulate the preparation of a fruit pie, 60 grams of the cross-linked starch acetate and 390 grams of sucrose were dispersed in 710 grams water and the pH was adjusted to 3.5 with citric acid. As before, the suspension was placed in a Corn Industries viscometer equipped with a hot-water jacket kept at 201° F. The torque in gm.-cm. of the starch, after 10 minutes, was 616; after 15 minutes, 888; after 40 minutes, 872; and the peak viscosity was 936 gm.-cm. torque. Above indicated that the cross-linked starch acylate had the proper paste viscosity characteristics for use as a fruit pie filling.

EXAMPLE 4

This example illustrates the preparation of a very lightly acetylated cross-linked starch acylate. One thousand grams of corn starch (dry solids basis), was suspended in 1,150 ml. of water in a 3-liter beaker and the suspension was adjusted to a pH of 9.8 with a NaOH–NaCl catalyst solution having 7.7 grams of NaCl per gram of NaOH. After the starch suspension was heated to 95° F., 10 grams of vinyl acetate was added. Fifteen minutes later the acylation reaction was terminated by lowering the pH of the reaction mixture to 2.5 with $H_2SO_4$ and the acetaldehyde generated during the acylation step started to cross-link the starch. The alkaline fluidity of the starch dropped from 36 cc. prior to the cross-linking to 17 cc. After a total of 50 minutes, at which point the starch acylate had an alkaline fluidity of 33 cc., the reaction was terminated by adjusting the pH of the reaction mixture to 6 with aqueous $NaCO_3$. The granular product was filtered, washed with water and then dried. The cross-linked starch acylate had an estimated acetyl content of about 0.1% by weight.

A dimethylol urea cross-linked corn starch, prepared as described in United States Patent 2,407,071, and frequently used in the manufacture of rock wool tile, and having approximately the same hot-paste characteristics as the acetaldehyde cross-linked starch acylate of this example, was compared with the cross-linked starch acylate of this example. Four samples having the compositions recorded in Table I below, were pasted in the Corn Industries viscometer at 201° F. The hot paste viscosities at 10, 15, 20 and 25 minutes are also recorded in Table I.

Table I

| Composition | Viscosity in grams-cm. after— | | | |
|---|---|---|---|---|
| | 10 Minutes | 15 Minutes | 20 Minutes | 25 Minutes |
| 55.0 grams Dimethylol urea cross-linked starch 937.9 grams Distilled water | 150 | 190 | 195 | 194 |
| 55.0 grams Acetaldehyde cross-linked starch acylate 937.9 grams Distilled water | 190 | 190 | 185 | 184 |
| 55.0 grams Dimethylol urea cross-linked starch 937.0 grams Distilled water 7.1 grams Boric acid | 235 | 228 | 220 | 215 |
| 55.0 grams Acetaldehyde cross-linked starch acylate 937.9 grams Distilled water 7.1 grams Boric acid | 305 | 300 | 290 | 275 |

The above data shows that the acetaldehyde-cross-linked starch acylate of this example has a decidedly higher hot paste viscosity when compounded with boric acid than the dimethylol urea cross-linked starch. This indicates that the acetaldehyde cross-linked starch acylates have the paste properties necessary for use in rock wool tile.

EXAMPLE 5

This example illustrates the preparation of a cross-linked waxy corn starch propionate. Five hundred grams of waxy corn starch (dry solids basis) was suspended in 800 ml. of water. After 15 grams of sodium carbonate and 35 grams of vinyl propionate were added to the suspension, it was maintained at 80° F. for one-half hour. The pH of the reaction was then adjusted to 2.5 with dilute $H_2SO_4$ and the temperature was raised to 110° F. After one hour the alkaline fluidity had risen to 95 cc. and the reaction was terminated by adjusting the pH of the reaction mixture to 6 with aqueous sodium carbonate. The granular product was filtered, washed with water and then dried.

EXAMPLE 6

This example illustrates the preparation of a cross-linked cellulose acetate. Ten grams of absorbent cotton was ground in a mill, making the fibers very short. The cotton was dispersed in 1,000 cc. of water and the suspension was made alkaline by the addition of two grams of sodium carbonate. After the addition of ten grams of vinyl acetate, the reaction mixture was maintained at 80° F. for 45 minutes. The pH of reaction mixture was adjusted to 2.5 with dilute $H_2SO_4$ and allowed to stand overnight. The pH was then adjusted to 5.5 with dilute sodium carbonate. The cross-linked cellulose acetate was dewatered by vacuum filtering and washed with water.

Since many embodiments of this invention may be made and since many changes may be made in the embodiments described, the foregoing is to be interpreted as illustrative only and our invention is defined by the claims appended hereafter.

We claim:

1. The process of preparing cross-linked polysaccharide acylates, which comprises acylating a polysaccharide selected from the group consisting of starch and cellulose with a vinyl ester of a monocarboxylic acid at an alkaline pH, whereby acetaldehyde is generated in situ, adjusting the pH of the reaction mixture to below 4, whereby the acylation reaction is terminated, and maintaining the pH below 4 to cause said acetaldehyde to react with the polysaccharide.

2. The process of preparing cross-linked starch acylates, which comprises acylating starch in the presence of at least about 10% by weight water with a vinyl ester of a monocarboxylic acid at an alkaline pH, whereby acetaldehyde is generated in situ, adjusting the pH of the reaction mixture to below 4, whereby the acylation reaction is terminated, and maintaining the pH below 4 to cause said acetaldehyde to react with the starch.

3. The process of claim 2 wherein the vinyl ester is vinyl acetate.

4. The process of preparing cross-linked starch acylates, which comprises acylating starch in the presence of at least 10% by weight water with a vinyl ester of a monocarboxylic acid at an alkaline pH, whereby acetaldehyde is generated in situ, adjusting the pH of the reaction mixture to below 4, whereby the acylation reaction is terminated, maintaining the pH below 4 to cause said acetaldehyde to react with the starch, and then terminating said cross-linking reaction by adjusting the pH of the reaction mixture to at least about 5.

5. The process of preparing cross-linked starch acylates, which comprises acylating starch in an alkaline, aqueous suspension thereof with a vinyl ester of a monocarboxylic acid, whereby acetaldehyde is generated in situ, adjusting the pH of the reaction mixture to below 4, whereby the acylation reaction is terminated, and maintaining the pH below 4 to cause said acetaldehyde to react with the starch.

6. The process of claim 5 wherein the vinyl ester is vinyl acetate.

7. The process of preparing cross-linked starch acylates, which comprises acylating starch in an alkaline, aqueous paste thereof with a vinyl ester of a monocarboxylic acid, whereby acetaldehyde is generated in situ, adjusting the pH of the reaction mixture to below 4, whereby the acylation reaction is terminated, and maintaining the pH below 4 to cause said acetaldehyde to react with the starch.

8. An acetaldehyde cross-linked starch acylate.
9. An acetaldehyde cross-linked starch acetate.
10. An acetaldehyde cross-linked starch propionate.

References Cited in the file of this patent

UNITED STATES PATENTS

| | | |
|---|---|---|
| 2,342,612 | Hansley | Feb. 22, 1944 |
| 2,461,139 | Caldwell | Feb. 8, 1949 |